(No Model.)
J. J. SLATER.
GRAIN, ROOT, AND COMPOST DROPPER.
No. 262,138. Patented Aug. 1, 1882.
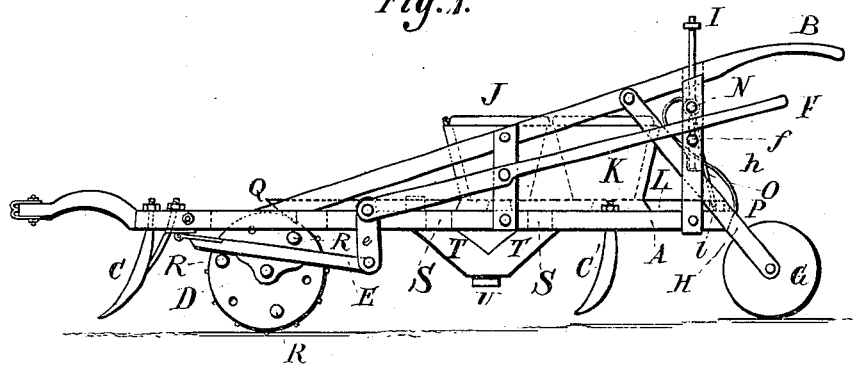
*Fig. 1.*
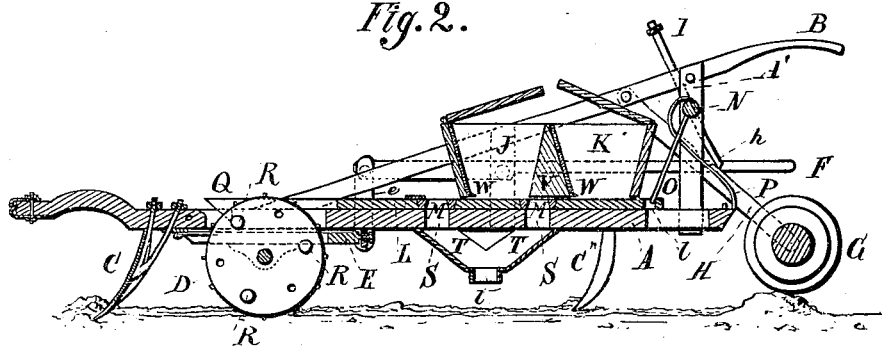
*Fig. 2.*
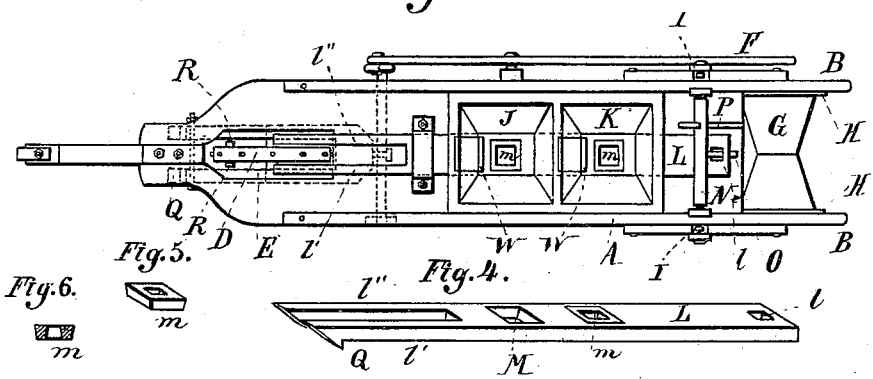
*Fig. 3.*
Witness:
Carl Spengel.
J. M. Hopkins.
Inventor:
James J. Slater
By Knight Bros.
Attys.

UNITED STATES PATENT OFFICE.

JAMES J. SLATER, OF LINDALE, OHIO, ASSIGNOR OF ONE-HALF TO THOMAS W. TOWNSLEY AND JAMES B. TOWNSLEY, BOTH OF SAME PLACE.

GRAIN, ROOT, AND COMPOST DROPPER.

SPECIFICATION forming part of Letters Patent No. 262,138, dated August 1, 1882.

Application filed March 7, 1882. (No model.)

*To all whom it may concern:*

Be it known that I, JAMES J. SLATER, of Lindale, in the county of Clermont and State of Ohio, have invented a new and useful Grain, Root, and Compost Dropper, of which the following is a specification.

My invention relates to improvements in seed, root, and compost dropping implements readily convertible, for use with various crops and fertilizers, and whose seed delivery and covering wheels are convertible into running-gear at will.

In the accompanying drawings, Figure 1 is a side elevation of a machine for dropping and covering in drills either grain, roots, or compost, or any one, two, or all of such, the machine being shown in condition for transportation from place to place as a simple vehicle—a condition in which the dropping mechanism is inoperative. Fig. 2 is a longitudinal section of the same, the machine being shown in condition for seeding. Fig. 3 is a top view of the machine. Fig. 4 shows the delivery-slide detached. Figs. 5 and 6 represent by perspective view and section my form of hollow plug for apertures of delivery-slide.

The device consists of an oblong frame, A, upon the central part of which is a hopper divided into two compartments, J K, by a transverse partition, V. A horizontal slide, L, fits into a recess in the hopper-bottom, and is capable of being reciprocated longitudinally of the frame. This slide is provided with two feed or delivery openings, M, one arranged before the other longitudinally of the frame, which openings in the most forward position of the slide register with corresponding openings, S, in the frame. The openings S are located one immediately in front of the hopper and the other beneath its partition V.

The internal areas of the delivery-openings M are capable of modification to suit different seeds, roots, or descriptions of compost by the insertion of plugs *m* of divers capacities.

Attached beneath the frame, and communicating with both apertures S, is a tube, T T, which converges downward to a delivery-spout, U.

The slide L is provided at its front end with two arms, $l'$ $l''$, of which each has a downturned hook, Q.

At the rear end of this slide is a slot or recess, $l$, into which enters the end of an arm, O, projecting from a horizontal rock-shaft, N, journaled in uprights A' of the frame. This rock-shaft has one end of an S-shaped spring, P, attached to its periphery, the other end of said spring being attached to or engaged in the frame. This spring attachment effects to retreat the delivery-slide the instant that it becomes disengaged from its forwarding mechanism.

Beneath the forward end of the frame A is a carrying-wheel journaled in the free extremity of a vertically-vibrating frame, E, that is hinged by its forward end to said frame A. This wheel has a circular series of pins, R, that project at regular intervals horizontally from its face, and as the wheel revolves with the travel of the machine along the ground the pins R engage the hooked extremities Q of the slide L, carrying it forward to the point at which its delivery-apertures register with those of the frame, and then resigning it to the action of the spring attachment N O P, which instantly retracts it to its normal position, so as to afford time for the refilling of the apertures or pockets M with seed, roots, or compost, as the case may be.

The hopper is provided with two strikers or cut-offs, W, one being placed upon and projecting horizontally rearward from the forward wall of each compartment. These strikers serve to level off and separate from the contents of the pockets all material in excess of what suffices to fill them.

In the rear of and to the right and left sides, respectively, of the delivery-spout U are fixed a pair of clod-breaking and grain-covering shares, C' C''.

In rear of the frame A a "floating" roller, G, of the represented contracted middle or hour-glass form, is journaled in the free end of a vertically-swinging frame, H, whose forward end is hinged to the stilts B or other projection of the frame. The office of this floating roller is to cover and compact the ground about the seed.

When it is desired to discontinue the seeding operation and to convert the implement into a simple wheeled vehicle for transportation from place to place, such change is effected by means as follows: The carrying-wheel D is thrown out of engagement with the slide L by means of a lever, F, terminating at the rear of the implement. The forward end of this lever is pivoted to the upper end of a link, e, which connects it with the vibrating frame E, in which the carrier-wheel is journaled. An upward pull upon the lever until it engages over the catch f depresses the wheel-frame E and throws the studs R out of range of contact with the hooks Q.

Pivoted to the frame-standards A are levers, I, whose lower ends are capable of being pressed into notches h in the swinging or vibrating journal-frame H of the floating roller. This action forces and retains the roller G to the depressed position shown in Fig. 1.

In the depressed positions of the carrying-wheel D and the roller G all the shares are lifted clear of contact with the ground, and, as already stated, the seed-delivery mechanism clear of contact with the operating-studs R, so as to convert the implement into a simple wheeled vehicle, of which the members D and G then serve simply as the running-gear.

Having thus described my invention, the following is what I claim as new therein and desire to secure by Letters Patent:

1. In a grain, root, or fertilizer drill or dropper, the combination of forward or carrying wheel D in vertically-vibrating frame E, connected by link e with a lever, F, that engages in the rear of the implement in catch f, and the floating roller G in vertically-swinging frame H, having notches h for engagement of the levers I, whereby the forward or carrying wheel is thrown downward out of engagement with the delivery-slide and the rear covering-float is rendered rigid, for the purpose explained.

2. In a walking seed-planter, the combination of slide-actuating ground-wheel D and earth-compacting float G, journaled in vibrating frames E and H, capable of optional depression by the combined levers F S and catches f h, substantially as set forth.

In testimony of which invention I hereunto set my hand.

JAMES J. SLATER.

Attest:
GEO. H. KNIGHT,
SAML. S. CARPENTER.